United States Patent [19]

Bozon et al.

[11] 4,374,047

[45] Feb. 15, 1983

[54] PROCESS FOR APPLICATION OF A CATALYTICALLY ACTIVE COATING CONTAINING PLATINUM, PALLADIUM OR RHODIUM OR THEIR MIXTURES TO A CARRIER AND PRODUCT MADE BY SAID PROCESS

[75] Inventors: Alfred Bozon, Erlensee; Eduard Lakatos, Linsengericht; Edgar Koberstein, Alzenau; Hans-Dieter Pletka, Freigericht; Herbert Völker, Hanau, all of Fed. Rep. of Germany

[73] Assignee: Degussa Aktiengesellschaft, Frankfurt, Fed. Rep. of Germany

[21] Appl. No.: 233,252

[22] Filed: Feb. 10, 1981

[30] Foreign Application Priority Data

Feb. 21, 1980 [DE]  Fed. Rep. of Germany ....... 3006398

[51] Int. Cl.³ .................... B01J 23/42; B01J 23/44; B01J 23/46
[52] U.S. Cl. ................... 252/472; 423/213.5
[58] Field of Search ............. 252/466 PT, 472, 463; 423/213.5, 628

[56] References Cited

U.S. PATENT DOCUMENTS 2,854,404  9/1958  Prater et al. ............. 252/466 PT
4,149,961  4/1979  Antos ..................... 252/466 PT Primary Examiner—W. J. Shine
Attorney, Agent, or Firm—Beveridge, DeGrandi & Kline

[57] ABSTRACT

A process for applying a coating containing platinum and/or palladium to the surface of a porous catalyst carrier, the depth of penetration being controlled by preloading the carrier with a determined amount of aqueous solution containing ammonium chloride.

5 Claims, No Drawings

PROCESS FOR APPLICATION OF A CATALYTICALLY ACTIVE COATING CONTAINING PLATINUM, PALLADIUM OR RHODIUM OR THEIR MIXTURES TO A CARRIER AND PRODUCT MADE BY SAID PROCESS

The invention relates to an improved process for application of a coating or film containing platinum and/or palladium, and if necessary also other platinum group metals and/or non-noble metals by means of compounds of the metals, to the outer surface of porous catalyst carriers, i.e. those having a large surface area.

Catalyst carriers are in general materials with a large surface area on which the catalytically active substances are precipitated in a thin layer. Since the heterogeneous catalysis takes place on the catalyst surfaces, a large carrier surface increases the effect of the generally valuable catalytically active substances, so that the amounts required for this remain in the economical range.

It is known to spray particulate catalyst carriers for surface impregnation, if necessary in the hot state, with a concentrated aqueous solution of the salts of the active components, in which the water is in considerable deficiency in relation to the ability of the carrier to take it up, and then to calcine the impregnated carrier. In certain cases, the impregnation can be facilitated by prior evacuation of the catalyst carrier.

A further known process similar to surface impregnation for the application of catalytically active substances to catalyst carriers is the so-called vapor phase impregnation, in which, for example, a hot stream of butane laden with aluminum chloride is passed over the carrier bodies and the aluminum chloride is deposited on these.

Furthermore, it is already known to dissolve platinum salts in methanol, acetone, methyl acetate or similar solvents, to impregnate the catalyst carrier with this solution and to ignite it, reduction of the platinum thereby occurring (British Pat. No. 496,579). According to another known process, platinum salts are dissolved in high-boiling organic oils, e.g., fish oil (boiling point above 250° C.). This solution is applied to the catalyst carrier with a maximum penetration depth of 1 mm, and the oil is then removed by heating so that it ignites (British Pat. No. 594,463).

These processes have the disadvantage that they must be carried out in closed containers. A uniform distribution of active substance on the catalyst carrier is not guaranteed, so that catalysts with varying quality are obtained. A further disadvantage is the high loss of active components.

Attempts have also been made previously to regulate the penetration depth of the impregnating solution by filling up the pore structure of a carrier, before impregnation with a solution of salts of the catalytically active elements, with an aqueous (U.S. Pat. No. 3,565,830) or organic (U.S. Pat. No. 2,746,936) preloading liquid; non-miscibility of the preloading and impregnating liquids also being proposed (see also U.S. Pat. No. 3,985,682).

It is indeed now possible to achieve a certain enrichment of the noble metal salts on the carrier surface according to the said processes; however, it is almost impossible to find an organic solvent which is not shown to be harmful to health because of long-term action on the human organism. Apart from this, it is very complicated to work with different solvents for precoating and impregnation, since this means an increased cost of apparatus and processing.

It has now been surprisingly found for catalyst systems containing platinum group metals, such as platinum or palladium, as active substance that the use of organic liquids, previously presented as an advantage as against water as preloading liquid, can be dispensed with if the porous catalyst carrier is impregnated with an aqueous solution of ammonium chloride within a certain concentration range, the saturation of the catalyst carrier not being exceeded, and a solution of the catalytically active elements in water is added and finally the liquid is removed by heating.

The object of the invention is accordingly a process for the application of a coating or film containing platinum and/or palladium, optionally in combination with other platinum group metals and/or non-noble metals in metallic or oxide form, by means of an aqueous solution of these metals, to the surface of porous catalyst carriers by impregnation with a pretreatment or preloading liquid containing ammonium chloride, the saturation of the catalyst carrier not being exceeded, and also subsequent addition of the aqueous solution of the catalytically active elements and removal of the liquid phase by heating. The process is characterized in that the preloading is carried out with an aqueous solution containing a maximum of 1, preferably 0.05–0.8 wt.%, of ammonium chloride.

The catalytic properties can be further modified in an advantageous manner by an after-treatment such as reduction or tempering at high temperature.

The particular advantage of the process according to the invention is that by means of the concentration of ammonium chloride employed at any given time in the aqueous precoating phase an optimum enrichment of the noble metal at the carrier surface can be set up. For example, with a combination of platinum, palladium and rhodium, platinum is very strongly concentrated locally, palladium strongly, and rhodium only moderately.

The activity of catalysts produced by the process according to the invention is dependent on the maintenance of the prescribed ammonium chloride concentration in the precoating water. If the maximum concentration given is exceeded, the opposite effect surprisingly occurs, and the catalysts, in spite of higher surface concentrations of noble metal, do not even provide those activities which are provided by catalysts produced by the known processes. Ammonium chloride concentrations above 1 wt.% in the precoating water are thus unusable.

The prejudice due to the numerous known processes which require an organic liquid for precoating is also overcome with the invention, and at the same time an unexpected favorable action of catalysts for elimination of exhaust gases containing hydrocarbon, carbon monoxide, and nitrogen oxide is achieved.

Any materials can be used in the process as catalyst carriers which have porous surfaces and are chemically and physically resistant.

Materials which fulfill these requirements can be of natural or synthetic origin. Included in them are aluminum oxides of the transition series, corundum, kieselguhr, titanium dioxide, silicon carbide, alumina, silicates, pumice, kaolin, asbestos, zeolites, and/or magnesia, singly or in mixtures.

These materials can be used both as particulate material in sphere, cylinder, cube, fragment, and bead form, and as monoliths. Carrier materials can also be applied to suitable structural reinforcers, such as cordierite, mullite, or metal, preferably stainless steel, in particular, aluminum containing chromium-iron alloys.

BRIEF DESCRIPTION OF THE DRAWINGS

In the accompanying drawings there are shown:

FIG. 1, in three diagrams, the attrition occurring with the conventional precoating with water for the noble metals platinum, palladium and rhodium of the catalyst composition according to comparison example 5 in dependence on the average radius of the spherical carrier, and FIG. 2, likewise in three diagrams, the attrition occurring with precoating according to the invention with NH4Cl-containing water for the noble metals platinum, palladium and rhodium of the catalyst composition according to Example 6, in dependence on the average radius of the spherical carrier.

From a comparison of the shape of the curves in the diagrams of FIG. 1 and FIG. 2, it can be seen that the procedure according to the invention leads to a considerably greater enrichment of the noble metals in the outer layers of the carrier than a conventional water precoating.

The process is further described and explained with reference to the following examples:

EXAMPLE 1

(Comparison Example)

One liter of $\gamma$-Al$_2$O$_3$ extrudates is impregnated with a cold-saturated solution of ammonium chloride in methanol. An aqueous solution of 0.88 g of platinum, palladium and rhodium in weight proportions 10:4:1 is added under rolling and intensively mixed with the precoated extrudates. The mixture is ignited and calcined. The extrudates are then treated by reduction for 1 hour in a stream of hydrogen at 500° C.

EXAMPLE 2

(Comparison Example)

One liter of $\gamma$-Al$_2$O$_3$ extrudates is precoated with deionized water until the predetermined pore volume is filled. An aqueous solution of 0.88 g of platinum, palladium and rhodium in weight ratio 10:4:1 is added under rolling and intensively mixed with the impregnated extrudates. The mixture is dried by heating and then treated by reduction for 1 hour in a stream of hydrogen at 500° C.

EXAMPLE 3

(According to Invention)

One liter of $\gamma$-Al$_2$O$_3$ extrudates is precoated with deionized water containing 1 wt.% NH$_4$Cl until the predetermined pore volume is filled. An aqueous solution of 0.88 g of platinum, palladium and rhodium in weight ratio 10:4:1 is added under rolling and intensively mixed with the impregnated extrusions. The mixture is dried by heating and then treated by reduction for 1 hour in a hydrogen stream at 500° C.

EXAMPLE 4

The catalysts produced according to Examples 1, 2 and 3 were tested for function as three-way catalysts in the exhaust gas stream of a gasoline engine, in the fresh and aged state. The test parameters were as follows:

4-cylinder injection engine with Bosch K-Jetronic
dynamic test: frequency 1 Hz
Z-fluctuation width: ±0.034
exhaust gas temperature: 400° C.
space velocity: 100,00 h$^{-1}$
light off test: static Z~1.0
catalyst ageing: 100 H engine The following exhaust gas concentration was measured before the catalyst:

CO 3–1.5 vol.%
HC 380–300 ppm
NO$_x$ 2400–1700 ppm
O$_2$ 1.7–vol.%
CO$_2$ 10–12 vol.%

The results of these tests on the catalyst produced according to the invention are contained, together with those for the comparison catalysts, in Tables 1 and 2.

TABLE 1

| | Activity Test of the Fresh Catalysts | | | | | | | | | | |
|---|---|---|---|---|---|---|---|---|---|---|---|
| | Dyn. Test | | | Light Off Test T° C. | | | | | Max Conversion 400° C. | | |
| of Example | CO% | HC% | NO$_x$% | CO 50% | CO 90% | HC 50% | HC 70% | NO$_x$ 50% | CO% | HC% | NO$_x$% |
| 1 | 67.6 | 77.7 | 78.4 | 365 | 382 | 366 | 370 | 367 | 94.6 | 87.0 | 91.7 |
| 2 | 65.8 | 78.9 | 82.5 | 368 | — | 368 | 377 | 371 | 83.3 | 86.3 | 91.7 |
| 3 (according to inv.) | 67.7 | 79.9 | 86.0 | 366 | 370 | 366 | 369 | 367 | 93.7 | 89.0 | 95.6 |

TABLE 1

| | Activity Test of the Fresh Catalysts | | | | | | | | | | |
|---|---|---|---|---|---|---|---|---|---|---|---|
| | Dyn. Test | | | Light Off Test T° C. | | | | | Max Conversion 400° C. | | |
| of Example | CO% | HC% | NO$_x$% | CO 50% | CO 90% | HC 50% | HC 70% | NO$_x$ 50% | CO% | HC% | NO$_x$% |
| 1 | 67.2 | 69.1 | 63.1 | 377 | — | 381 | 400 | 382 | 83.8 | 70.9 | 73.2 |
| 2 | 68.5 | 75.2 | 64.2 | 368 | — | 370 | 387 | 372 | 85.7 | 79.8 | 78.5 |
| 3 (according to inv.) | 69.0 | 76.0 | 68.1 | 359 | 393 | 363 | 369 | 363 | 91.7 | 83.1 | 83.1 |

Conversion in the dynamic test, light off behavior, and maximum conversion at 400° C. were decisively improved by impregnation of the catalyst carrier according to the inventive process.

EXAMPLE 5

(Comparison Example)

One liter of spherical carriers of $\gamma$-Al$_2$O$_3$ (2.8–4 mm diameter) is pretreated as in Example 2 and impregnated with noble metals. The noble metal ratio is platinum, palladium and rhodium=5:2:1 with a total concentration of 0.6 g per liter of catalyst carrier. After impregnation, the catalyst is dried and then treated by reduction for half an hour at 550° C. in a stream of hydrogen.

EXAMPLE 6

(According to the Invention)

One liter of spherical carriers of $\gamma$-$Al_2O_3$ (2.8–4 mm diameter) is pretreated as in Example 3 and impregnated with noble metal. The noble metal ratio and the concentration are as described in Example 5. After impregnation, the catalyst is dried and then treated by reduction for half an hour at 550° C. in a stream of hydrogen.

EXAMPLE 7

Under the test conditions as described in Example 4, the activity of the catalysts prepared as in Examples 5 and 6 was tested after ageing for 100 h on the engine. The results are summarized in Tables 3 and 4.

TABLE 3

| Dynamic Conversion after 100h engine ageing | | | |
|---|---|---|---|
| Catalyst of Example | % CO | % HC | % $NO_x$ |
| 5 | 61.9 | 69.2 | 51.8 |
| 6 (of inv.) | 63.1 | 71.9 | 56.0 |

TABLE 4

| Light off test, static and maximum conversion at 400° C. after 100h engine ageing | | | | | | | |
|---|---|---|---|---|---|---|---|
| | Light off test T° C. | | | | | Max. conv. | |
| Catalyst of Example | CO 50% | CO 90% | HC 50% | HC 70% | $NO_x$ 50% | % CO | % HC | % $NO_x$ |
| 5 | 372 | — | 383 | — | — | 62.5 | 60.0 | 49.3 |
| 6 (of inv.) | 359 | — | 373 | — | 381 | 71.8 | 68.9 | 65.1 |

Here also there is again shown the clear superiority of the impregnation method according to the invention as against a conventional process.

EXAMPLE 8

To determine the radial distribution of noble metal, 250 g of each of the catalysts according to Examples 5 and 6 were sieved out (sphere diameter 3.7 mm), weighed into a 1 liter beaker, and treated with methylene chloride. To erode the sphere layers, they were shaken in a Turbula mixer. Samples are taken for noble metal determination (X-ray fluorescence analysis) after 2, 4, 6, 8, 10, 15, 20, 25, 30 and 45 min. The methylene chloride with the eroded $Al_2O_3$ and noble metal was decanted off for this purpose, and the remaining catalyst was respectively washed.

The noble metal concentrations are plotted in FIGS. 1 and 2 in dependence on the sphere radius (average initial radius 1.85 mm). As can be seen from the concentration curves for attrition, the platinum concentration in the edge zone of the catalyst carrier is increased by the impregnation method according to the invention to 6 times the value of the concentration of a catalyst produced conventionally as in Example 5, and the palladium and rhodium concentrations were, respectively, increased to 4 times and 2 times the corresponding values.

EXAMPLE 9

(Comparison Example)

One liter of $\gamma$-$Al_2O_3$ spherical carriers is pretreated as in Example 2 and impregnated with noble metal. The noble metal concentration is 0.88 g/liter, with a Pt/Pd ratio of 5:1. After impregnation, the catalyst is dried and then treated by reduction for 1 hour at 500° C. in a stream of hydrogen.

EXAMPLE 10

(According to the Invention)

One liter of $\gamma$-$Al_2O_3$ spherical carriers is pretreated as in Example 3 and impregnated with noble metal. Noble metal concentration and ratio are as in Example 9. The after-treatment was likewise performed as in Example 3.

EXAMPLE 11

Under the test conditions as described in Example 4, the activity of the catalysts produced as in Examples 9 and 10 was tested after 100 h engine ageing. The results are collected in Tables 5 and 6.

TABLE 5

| Dynamic Conversion after 100h Engine Ageing | | | |
|---|---|---|---|
| Catalyst of Example | % CO | % HC | % $NO_x$ |
| 9 | 80.1 | 75.3 | 73.1 |
| 10 (of inv.) | 82.0 | 74.1 | 75.0 |

TABLE 6

| Light Off Test, Static and Maximum Conversion at 400° C. after 100h Engine Ageing | | | | | | | |
|---|---|---|---|---|---|---|---|
| | Light Off Test T° C. | | | | | Max. Conv. | |
| Catalyst of Example | CO 50% | CO 90% | HC 50% | HC 70% | $NO_x$ 50% | % CO | % HC | % $NO_x$ |
| 10 | 336 | — | 349 | 394 | 350 | 85.3 | 72.4 | 79.1 |
| 10 (of inv.) | 330 | — | 346 | 389 | 341 | 89.0 | 74.3 | 82.7 |

EXAMPLE 12

(Comparison Example)

One liter of spherical carriers of $\gamma$-$Al_2O_3$ is impregnated and treated as in Example 9. The noble metal ratio Pt/Rh is 15:1.

EXAMPLE 13

(According to the Invention)

One liter of spherical carriers of $\gamma$-$Al_2O_3$ is impregnated and treated as in Example 10. The noble metal ratio Pt/Rh 15:1.

EXAMPLE 14

Under the test conditions as described in Example 4, the activity of the catalysts produced as described in Examples 12 and 13 was tested after 100 h ageing on the engine. The results are collected in Tables 7 and 8.

TABLE 7

| Dynamic Conversion after 100h Engine Ageing | | | |
|---|---|---|---|
| Catalyst of Example | % CO | % HC | % $NO_x$ |
| 12 | 72.7 | 70.7 | 62.2 |
| 13 (of inv.) | 75.6 | 73.8 | 66.2 |

TABLE 8

Light Off Test, Static and Maximum Conversion at 400° C. after 100h Engine Ageing

| Catalyst of Example | Light Off Test T° C. | | | | | Max. Conv. | | |
|---|---|---|---|---|---|---|---|---|
| | CO 50% | CO 90% | HC 50% | HC 70% | $NO_x$ 50% | % CO | % HC | % $NO_x$ |
| 12 | 367 | — | 382 | — | 386 | 71.9 | 60.5 | 60.3 |
| 13 (of inv.) | 351 | — | 368 | — | 371 | 77.8 | 65.8 | 69.1 |

EXAMPLE 15

(Comparison Example)

One liter of spherical catalyst of $\gamma$-$Al_2O_3$ is treated and impregnated as in Example 9. The noble metal ratio Pt/Rh is 10:1.

EXAMPLE 16

One liter of spherical catalyst of $\gamma$-$Al_2O_3$ is precoated up to filling of the predetermined pore volume with deionized water containing 2% $NH_4Cl$. Further treatment is as described in Example 10. The noble metal ratio Pt/Rh is 10:1.

EXAMPLE 17

Under the test conditions as described in Example 4, the activity of the catalysts produced as in Examples 15 and 16 was tested after 100 h ageing on the engine. The results are collected in Tables 9 and 10.

TABLE 9

Dynamic Conversion after 100h Engine Ageing

| Catalyst of Example | % CO | % HC | % $NO_x$ |
|---|---|---|---|
| 15 | 64.1 | 59.8 | 53.5 |
| 16 | 59.2 | 54.0 | 52.6 |

TABLE 10

Light Off Test, Static and Maximum Conversion at 400° C. after 100h Engine Ageing

| Catalyst of Example | Light Off Test T° C. | | | | | Max. Conv. | | |
|---|---|---|---|---|---|---|---|---|
| | CO 50% | CO 90% | HC 50% | HC 70% | $NO_x$ 50% | % CO | % HC | % $NO_x$ |
| 15 | 345 | — | 372 | — | 396 | 78.0 | 61.1 | 51.6 |
| 16 | 350 | — | 384 | — | 399 | 73.0 | 56.1 | 50.6 |

As is clear from Examples 15 and 16, the improvement by means of the method of impregnation according to the invention is dependent on the $NH_4Cl$ concentration chosen in the precoating liquid. If this is too high, the positive effect of $NH_4Cl$ addition reverses to the opposite. In order to obtain the improved results relative to the state of the art, it is necessary to adhere to the boundary values for $NH_4Cl$ concentration established according to the process of the invention.

We claim:

1. In a process for application of a coating or film to the surface of a porous catalyst carrier, said coating or film formed from an aqueous solution comprising as the essential catalytic elements necessary to effect catalytic conversion of the harmful components in the exhaust stream of an automotive engine, a member consisting of platinum, palladium, or rhodium and mixtures thereof as the catalytic active material of an exhaust purification catalyst by means of an aqueous solution of these metals to the surface of a porous catalyst carrier by a first step of filling the pores of the carrier with a preloading step, then impregnating with said aqueous solution of essential catalytic element and heating the impregnated carrier to thereby remove the liquid phase of the solution containing the catalytically active material employed in said impregnation; wherein the preloading is carried out with a liquid which is an aqueous solution containing at most 1% ammonium chloride.

2. In the process of claim 1 wherein a mixture of platinum, palladium and rhodium is used on the catalytically active elements.

3. In the process of claims 1 or 2 wherein a reduction is carried out after the impregnation with the catalytically active elements.

4. A product made by the process of claims 1 or 2.

5. The process of claim 1 wherein the amount of ammonium chloride in said aqueous solution ranges from 0.05 through 0.8 wt.%.

* * * * *